Aug. 21, 1928.
E. V. BENJAMIN
1,681,760
APPARATUS FOR THE MANUFACTURE OF SODIUM SULPHATE AND HYDROCHLORIC ACID
Filed Jan. 2, 1925
2 Sheets-Sheet 1
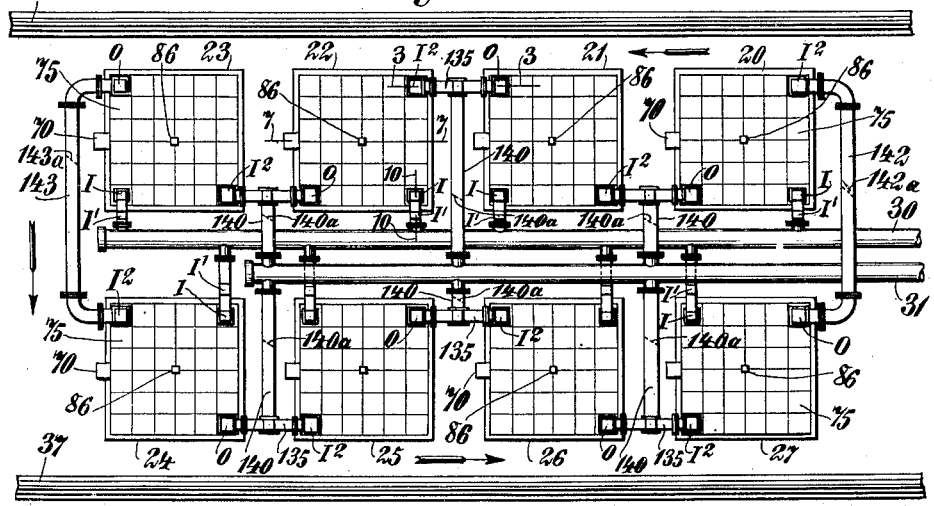
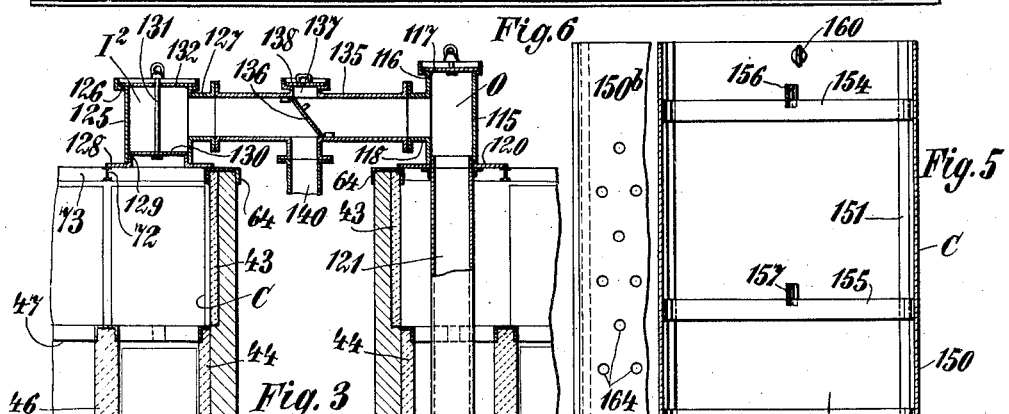
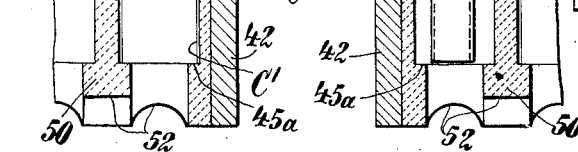
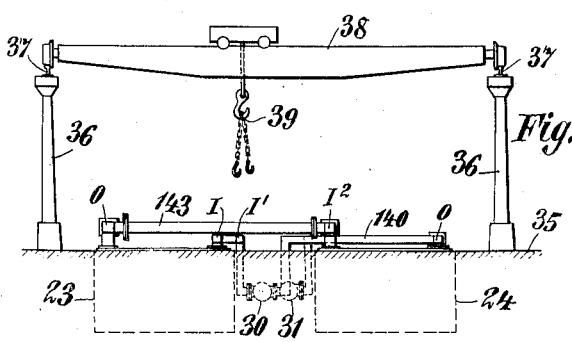
INVENTOR
*Emanuel V. Benjamin*
BY
ATTORNEY

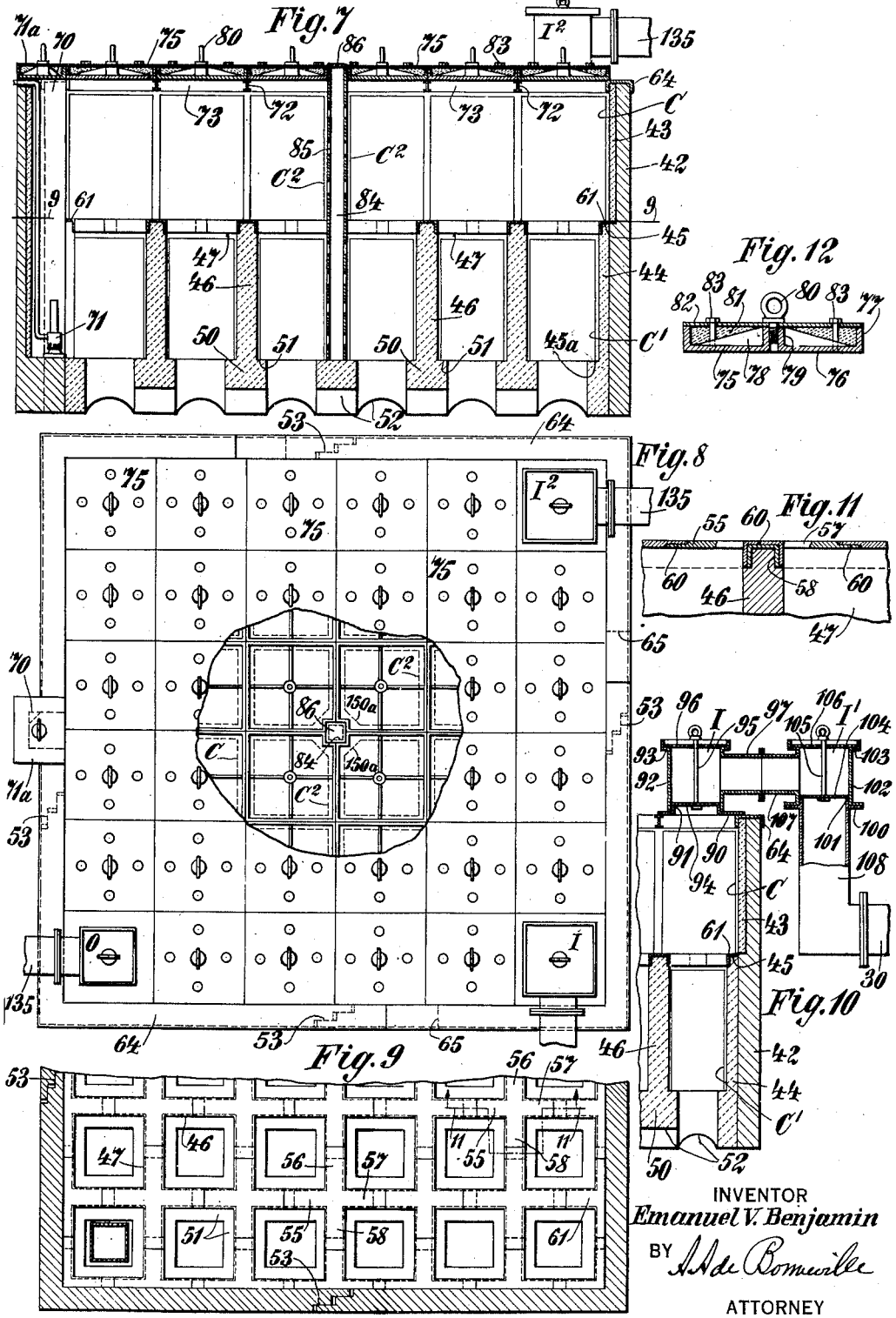

Patented Aug. 21, 1928.

1,681,760

UNITED STATES PATENT OFFICE.

EMANUEL V. BENJAMIN, OF NEW ORLEANS, LOUISIANA, ASSIGNOR TO MYLES SALT COMPANY, LIMITED, OF NEW ORLEANS, LOUISIANA, A CORPORATION OF LOUISIANA.

APPARATUS FOR THE MANUFACTURE OF SODIUM SULPHATE AND HYDROCHLORIC ACID.

Application filed January 2, 1925. Serial No. 128.

This invention relates to apparatus for the manufacture of sodium sulphate and hydrochloric acid.

The object of the invention is the production of apparatus for the manufacture of the sulphate and the hydrochloric acid, by means of which the material operated upon can be easily maintained at the proper temperature. A second object of the invention is the production of apparatus that can be efficiently and easily handled during its use. Other objects of the invention will be evident from the following specification and claims.

The organization of the invention comprises a decomposing chamber, or a plurality of them, which are located beneath the surface of the ground, to reduce the loss of heat therefrom and for their easy operation. In each of the chambers are placed a plurality of crates or baskets that constitute containers for chloride of sodium to be treated. The crates maintain the chloride in separated portions, by means of which the packing of lower stratums thereof is obviated, and the gases used to convert the chloride into the sulphate can thereby easily react on all the portions of the said chloride in the crates. The crates permit the easy charging and discharging of the ingredients of the decomposing chambers. Conduits are provided for the inflow and discharge of the gases for the decomposing chambers. The said gases comprise a mixture of sulphurous acid, water vapor or steam and air at the proper temperature. The disposition of the piping with its valves for the supply of the fresh sulphurous acid gas, with its mixture of water or steam and air is such that only one at a time of the decomposing chambers is charged therewith at its top end, and in which the decomposition of the chloride of sodium has been nearly finished. The gases leave each chamber at the bottom portion thereof through a conduit and enters the next chamber of the series at the top. The last of the series of the chambers in operation is closed to the next chamber, which has been opened for discharging the crates of the chloride, to be supplied with others, and its outlet valve connecting it to the exit gas pipe is opened to allow the discharge of the hydrochloric acid liberated in the process. By this disposition of the piping and valves of the apparatus each chamber of the series in turn is made the first, while the opposite end of the series is put into communication with the hydrochloric acid exit gas pipe.

In the accompanying drawings Fig. 1 represents a top plan view of an exemplification of the apparatus; Fig. 2 shows a left hand side view of Fig. 1; Fig. 3 indicates an enlarged section of Fig. 1 on the line 3, 3; Fig. 4 represents an enlarged top plan view of a crate; Fig. 5 is a section of Fig. 4 on the line 5, 5; Fig. 6 represents a front view of a fragmentary portion of the crate with a modification; Fig. 7 shows an enlarged section of Fig. 1 on the line 7, 7; Fig. 8 indicates a top plan view of Fig. 7 with a portion broken away; Fig. 9 is a section of Fig. 7 on the line 9, 9; Fig. 10 represents an enlarged section of Fig. 1 on the line 10, 10; Fig. 11 shows an enlarged section of Fig. 9 on the broken line 11, 11 and Fig. 12 shows an enlarged sectional view of a detail.

In the present exemplification the apparatus is shown to comprise two parallel series or rows of similar decomposing chambers see Figs. 1 and 2, which are charged with the ingredient to be treated, which in this case is either chloride of sodium or chloride of potassium. The chambers in one series are designated in their entireties by the numerals 20, 21, 22, 23 and the chambers in the second series are designated by the numerals 24, 25, 26 and 27. A supply pipe for the mixture of gases, that is to say sulphurous acid gas, air and water vapor or steam, which react on the chloride in the chambers is indicated at 30. A discharge or exit pipe for the hydrochloric acid liberated in the decomposing chambers is indicated at 31. The chambers 20 to 27 are sunk below the upper level 35 of the ground, to provide an efficient disposition of the parts of the apparatus for locating and discharging their crates, and for the efficient maintenance of the required temperature therein.

Columns 36, see Fig. 2, with the tracks 37 are provided for the traveling crane 38, the hoisting apparatus 39 for which latter can be located over any portion of the chambers, for handling the crates to be described.

Each of the decomposing chambers, Figs. 3, 7, 9 and 10, comprises the vertical walls 42, which in this instance are shown of brick provided with the refractory inner portions 43 and 44. The top faces of the portions 44 extend inwardly from the portion 43 to form ledges 45, and at the lower ends of the portions 44 are formed the ledges $45^a$. Within the walls 42 are formed the refractory cross walls 46 and 47, the upper faces of which are on the same level with the ledges 45 of the portion 44. The lower portions 50 of the cross walls 46 and 47 are somewhat thicker than the upper portions thereof, to form the ledges or shelves 51, on a level with the ledges $45^a$. Openings 52 are formed in all of the lower portions 50. The walls 42 may be provided with expansion joints 53. The top faces of the cross walls 46 and 47 are preferably capped with iron copings, each of which comprises an iron cross with the U shaped members 55, 56, 57 and 58, which engage each other. The iron crosses are located at the intersection of the cross walls 46 and 47. The outer ends of the members of one cross are halved with the members of the cross adjacent thereto as indicated at 60, the allow for expansion and contraction. The said coping also serves to preserve the top faces of the cross walls. The ledges 45 are also provided with iron copings 61, and comprise members that halve with each other. The top faces of the walls 42 are also preferably provided with U shaped iron copings 64, the ends of which are halved with each other as shown at 65. For one of the walls 42 of each decomposing chamber there is provided, a heat regulating chamber 70 with a source of heat, in this instance a Bunsen burner 71, and a cover $71^a$.

To the top ends of the walls 42, 3 and 7, are connected the I beams 72 and 73 at right angles to each other for supporting the detachable covers 75. Each of the covers 75 comprises the body portion 76 with the end flanges 77 and the ribs 78 with the threaded hub 79. An eyebolt 80 extends from each threaded hub 79. Heat insulating material 81 is provided for each of the covers and is held in place by a top plate 82, which in turn is fastened in place by screws 83, in threaded engagement with the body portion 76.

At the intersection of the cross walls 46 and 47 at the axial center of each decomposing chamber is located a chamber 84, see Figs. 7 and 8, having openings with the transparent plates 85, in its walls, and a cover 86 for its top end. The chamber 84 extends the full depth of the decomposing chamber and is used for observation and temperature control.

To each of the top portions of the decomposing chambers and in one corner thereof is provided an inlet valve designated in its entirety by the letter I, for detail see Fig. 10, for charging the chamber with the fresh sulphurous acid, water vapor or steam and air. Each inlet valve I comprises a foot 90 with the seat or top edge 91. Each foot 90 takes the place of one of the covers 75. A body portion 92 with the upper seating flange 93 extends from the foot 90.

A plate valve 94 is seated on the seat or edge 91 and has extending therefrom the operating handle 95, which extends through a cover 96 seated on the flange 93. An inlet connection 97 extends from the body portion 92. A second valve I' similar to I is indicated with the foot 100 having the upper edge or seat 101. A body portion 102 with the upper seating flange 103 extends from the foot 100. A plate valve 104 is seated on the seat 101 and has extending therefrom the operating handle 105, which extends through a cover 106 seated on the flange 103. A connection 107 extends from the body portion 102 and connects with the connection 97. A conduit 108 extends from the valve I' and connects with the supply pipe 30.

For each of the decomposing chambers there is provided an outlet connection designated in its entirety by the letter O, for detail see Fig. 3, and comprises the T 115 with the valve seat 116 at its top end, for the cover plate 117 and the cross connection 118. A plate 120 supports the T 115 and in turn is supported upon the top of the decomposing chamber, takes the place of one of the covers 75 and has extending therefrom the outlet conduit 121, which extends to the bottom of the chamber.

An inlet connection designated in its entirety by the letter $I^2$, for detail see Fig. 3, is provided for each of the decomposing chambers. Each connection $I^2$ comprises the T 125 with the valve seat 126 at its top end and the cross connection 127 at its side. A foot plate 128 with the valve seat 129 is supported on the top face of the next decomposing chamber and takes the place of one of the covers 75. The foot plate 128 supports the T 125. A valve 130 is adapted to bear on the valve seat 129. An operating handle 131 extends from the valve 130 through the cover plate 132, which latter is adapted to bear on the valve seat 126. A connection 135, see Fig. 3, connects the cross connections 118 and 127. A damper 136 is provided for the connection 135. An opening 137 with the cover 138 in the connection 135 provides means to open or close the damper 136. From each of the connections 135, a conduit 140 leads to the exhaust or exit pipe 31. A damper $140^a$ is provided for each conduit 140.

The outlet connection O of the decomposing chamber 27 is connected to the inlet connection $I^2$ of the decomposing chamber 20, by means of the cross conduit 142, see Fig. 1, having the damper $142^a$ connecting the two rows of decomposing chambers. The outlet connection O of the decomposing chamber 23 is connected to the inlet connection I² of the decomposing chamber 24, by means of the cross conduit 143 having the damper 143ᵃ connecting the two rows or series of decomposing chambers.

The crates or baskets for the decomposing chambers are designated in their entireties by the letter C, C' and C², see Figs. 3, 4, 5, 6, 8 and 10. The crates C and C' are similar, but vary in size, the crates C' being somewhat smaller than the crates C.

Each of the crates C and C' (Figs. 4 and 5) comprises the vertical side walls 150 connected by the angle irons 151. A grill bottom for the crate comprises the bars 152 which are connected to the walls 150 by means of the angle irons 153. Horizontal cross braces 154, 155, 156 and 157 connect the walls 150 of each crate. Eye bolts 160 extend from the walls 150 for the purpose of handling the crates.

The crates C² have each a pair of their vertical walls shaped as indicated at 150ᵃ (Fig. 8) to enable them to be located in the decomposing chambers adjacent to the chamber 84 and to clear the walls of the latter.

The modified crate indicated in Fig. 6 is of the same construction as described for the crates C, and C' with the exception that it is provided with walls 150ᵇ having the openings 164.

To operate the apparatus to produce the sulphate of sodium or sulphate of potassium, the crates are charged with chloride of sodium to produce the sulphate of sodium, or with chloride of potassium if sulphate of potassium is to be produced. The crates may be charged with the material to be treated from a hopper not shown, or the material may be shoveled into the crates, and the crates may be emptied by shoveling or turning them upside down.

In this instance the decomposing chambers are intended to be operated, one after the other in the direction of the arrows shown in Fig. 1 and it may be supposed that the covers 75, of the decomposing chamber 27 have been removed and the traveling crane 38 located over said chamber 27 to remove the crates C and C' therefrom with the chloride of sodium that has been treated, and to fill said crates with lumps of fresh charges of the chloride to be again located in said decomposing chamber 27. The smaller crates C' are supported on the ledges 51 and 45ᵃ and the larger crates C are supported on the copings having the members 55, 56, 57 and 58 and the coping 61. Each crate C is directly above one of the crates C'. All the inlet valves I and I', see Figs. 1 and 10, connecting the decomposing chambers with the supply pipe 30 for the fresh gases have been previously closed except those connected with the chamber 20. The inlet connection I² for the chamber 27 is closed. The inlet valve I and its coacting valve I' for the chamber 20 are open and the corresponding valves for all of the other decomposing chambers are closed. The crates C and C' in all the other chambers have been previously charged with lumps of chloride of sodium. The pipe 30 through the valves I and I' furnish a flow of a fresh mixture of the sulphurous acid gas, water vapor or steam and air to the upper portion of the decomposing chamber 20, which flows around and about all the lumps of chloride of sodium in all the crates in said decomposing chamber 20. The gases flow from the chamber 20 to the chamber 21 through the outlet connection O of the said chamber 20, and through the inlet connection I² of the chamber 21, the damper 140ᵃ in the conduit 140 having been closed. The mixture of gases now flows around and about the lumps of the chloride of sodium in the decomposing chamber 21, and leaves the latter through its outlet connection O and enters the decomposing chamber 22 through the inlet connection I² of the chamber 22, the inlet valves I and I' of the chamber 21 being closed as well as the damper 140ᵃ in the conduit between the chambers 21 and 22. In the same manner the gases reach the decomposing chamber 23, the last of the first series of the decomposing chambers. The gases leave the decomposing chamber 23 through its outlet connection O, pass through the cross conduit 143 and enter the decomposing chamber 24 of the second series through its inlet connection I². The inlet valves I and I' are supposed to be closed and the gas leaves the chamber 24 through its outlet connection O and enters the chamber 25 through its inlet connection I², the damper 140ᵃ in the conduit 140 between the chambers 24 and 25 being closed. In the same manner the mixture of gases flows from the decomposing chamber 25 and then to the decomposing chamber 26. From the latter the gases which for the most part consist of hydrochloric acid gas leave said chamber 26 by way of the conduit 140 indicated between the chambers 26 and 27.

The damper 140ᵃ in the latter conduit 140 is open, and the gas, for the most part hydrochloric acid escapes through the pipe 31.

When any of the chambers 24, 25 or 26 is charged with fresh chloride of sodium, the spent gases escape from the decomposing chamber 27 and enter the chamber 20 through the cross conduit 142. It will be noted the fresh mixture of gases of sulphurous acid, water vapor or steam and air only enters the chamber in which the decomposition of the chloride is nearly completed, and that each one of the chambers is made the last chamber of the series as the process proceeds in the manufacture of the sulphate of sodium.

When the chamber 20 is cut out of the series for charging, no gases for that period leave the chamber 27, as the damper 142ª in the pipe 142 is closed. When the chamber 24 is cut out for recharging, no gases leave the chamber 23, as the damper 143ª in the pipe 143 is closed for that period of time.

Various modifications may be made in the invention, for example, pipe 30 may be located below the pipe 31, the refractory portions 43 of the walls 42 of the decomposing chambers may be omitted, and the said walls may be made of ordinary brick or wholly of fire brick or other suitable material. The cross walls 46 and 47 may also be made of ordinary brick or other suitable material. The decomposing chambers may be wholly made of iron or other metal. The pipes and conduits may be made of iron or other suitable material. Various other modifications may be made in the invention and the present exemplication is to be taken as illustrative and not limitative thereof.

Having described my invention what I desire to secure by Letters Patent and claim is:

1. In an apparatus for the conversion of a metallic chloride into metallic sulphate, the combination of a decomposing chamber, outer walls for the chamber with upper and lower ledges on their inner faces, cross walls for the chamber extending from the bottom for a portion of its height, said cross walls having ledges adjacent to their lower ends and having openings at their lower ends, removable crates for the chloride to be treated, supported on the inner edges of the outer walls and the top ends of the cross walls, removable crates for the chloride supported on the lower edges of the outer walls and the ledges of cross walls, removable covers for the top of the chamber means to charge said chamber with a fresh supply of gases for treating said chloride, means for treating said chloride with gases that flow from another similar decomposing chamber and which have reacted on the chloride of said other chamber and means to direct the flow of gases liberated in the decomposing chamber.

2. In an apparatus of the character described the combination of a decomposing chamber comprising outer vertical walls having formed therewith upper ledges and lower ledges, vertical cross walls in the chamber between said outer walls extending from the bottom of the chamber upwardly a predetermined distance, said cross walls having ledges formed therewith on the same horizontal plane with the lower ledges of the outer walls, and the top level of the cross walls in the same plane with the upper ledges of the outer walls of the decomposing chamber, said cross walls having openings at their lower ends, cross beams extending between the outer walls at their upper ends, detachable covers for the decomposing chamber supported on said beams and the top ends of the outer walls, removable crates for the material to be treated, supported on the upper ledges of the outer walls, and upon the top faces of the cross walls and the lower ledges of the outer and inner walls, means to introduce a reacting agent into the decomposing chamber and an outlet for gases connected to the decomposing chamber.

3. In an apparatus of the character described the combination of a decomposing chamber, comprising outer vertical walls with upper and lower ledges, vertical cross walls in the chamber with their top ends on a level with the upper ledges of the outer walls and having ledges at their lower ends on a level with the lower ledges of the outer walls, said cross walls having openings in their lower ends, detachable covers for the decomposing chamber, a plurality of removable crates in the chamber for material to be treated, said crates having vertical side walls, a grill for the bottom of each crate, said grill comprising bars connected to the bottom ends of the side walls of said crate, means to introduce a reacting agent into the decomposing chamber and an outlet for gases connected to the decomposing chamber.

Signed at New Orleans in the parish of Orleans and State of La., this 4th day of December, A. D. 1924.

EMANUEL V. BENJAMIN.